US012739750B2

(12) United States Patent
Liu

(10) Patent No.: US 12,739,750 B2
(45) Date of Patent: Sep. 15, 2026

(54) POWER SAVING METHOD AND APPARATUS, DEVICE, AND READABLE STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/568,116

(22) PCT Filed: Jun. 8, 2021

(86) PCT No.: PCT/CN2021/098943
§ 371 (c)(1),
(2) Date: Dec. 7, 2023

(87) PCT Pub. No.: WO2022/257012
PCT Pub. Date: Dec. 15, 2022

(65) Prior Publication Data
US 2024/0276381 A1 Aug. 15, 2024

(51) Int. Cl.
*H04W 52/02* (2009.01)

(52) U.S. Cl.
CPC ... *H04W 52/0235* (2013.01); *H04W 52/0203* (2013.01)

(58) Field of Classification Search
CPC ......... H04W 52/0235; H04W 52/0203; H04W 52/02; H04W 52/0216; H04W 52/0229; Y02D 30/70; H04L 5/0048
See application file for complete search history.

(56) References Cited

U.S. PATENT DOCUMENTS

2021/0321330 A1* 10/2021 Ang .................. H04W 52/0216
2022/0303089 A1* 9/2022 Liao ...................... H04L 5/0091
2022/0322281 A1* 10/2022 Liao ................... H04W 68/005
2023/0032154 A1* 2/2023 Hwang ................. H04L 5/0053
2023/0336298 A1* 10/2023 Wagner ................. H04L 5/0048
2024/0064637 A1* 2/2024 Gurumoorthy ....... H04W 56/00
2024/0072961 A1* 2/2024 Priyanto ............. H04W 72/232
(Continued)

FOREIGN PATENT DOCUMENTS

CN 103108405 A 5/2013
CN 104488320 A 4/2015
CN 110072285 A 7/2019
(Continued)

OTHER PUBLICATIONS

Xiaomi, R1-2102992: On TRS/CSI-RS configuration and indication for idle/inactive UEs (Year: 2021).*
Apple Inc., R1-2103116: Indication of TRS/CSI-RS for idle/inactive-mode UE power saving (Year: 2021).*
CATT, R1-2100393: Configuration of TRS/CSI-RS for paging enhancement (Year: 2021).*
MediaTek Inc., R1-2100592: On TRS/CSI-RS occasion(s) for idle/inactive mode UE power saving (Year: 2021).*
(Continued)

*Primary Examiner* — Andrew W Chriss
(74) *Attorney, Agent, or Firm* — Volpe Koenig

(57) ABSTRACT

A method, apparatus, and computer readable medium for power saving. The method performed by an access network device and includes: transmitting configuration information to a terminal, wherein the configuration information is used for configuring a relevant configuration of a tracking reference signal (TRS) for the terminal, and the relevant configuration comprises an acquisition mode for TRS available information.

19 Claims, 4 Drawing Sheets

(56) References Cited

U.S. PATENT DOCUMENTS

2024/0187988 A1* 6/2024 Maleki .............. H04W 52/0216
2024/0235785 A1* 7/2024 Maleki .................. H04L 5/0053

FOREIGN PATENT DOCUMENTS

| | | | |
|---|---|---|---|
| CN | 110447286 | A | 11/2019 |
| CN | 111034300 | A | 4/2020 |
| CN | 111345075 | A | 6/2020 |
| CN | 112243575 | A | 1/2021 |
| CN | 112449745 | A | 3/2021 |
| CN | 112567791 | A | 3/2021 |
| CN | 112673685 | A | 4/2021 |
| WO | 2019028849 | A1 | 2/2019 |

OTHER PUBLICATIONS

Intel Corporation, R1-2100663: TRS/CSI-RS functionality during idle/inactive mode (Year: 2021).*

Samsung, R1-2101218: Moderator summary for TRS/CSI-RS occasion(s) for idle/inactive UEs (Year: 2021).*

Samsung, R1-21XXXX: Summary for TRS/CSI-RS occasion(s) for idle/inactive UEs (Year: 2021).*

Xiaomi Communications, “Discussion on TRS CSI-RS for RRC-IDLE and RRC-INACTIVE State UE”, 3GPP TSG-RAN WG2 Meeting #113-bis electronic, R2-2102863, Online, Apr. 12-Apr. 20, 2021.

* cited by examiner configuration information is transmitted to a terminal, where the configuration information is used for configuring a relevant configuration of a tracking reference signal (TRS) for the terminal

201

Terminal

Access network device

401， the access network device transmits configuration information to the terminal 402， the terminal receives the configuration information transmitted by the access network device 403， the terminal acquires the TRS available information based on the configuration information

POWER SAVING METHOD AND APPARATUS, DEVICE, AND READABLE STORAGE MEDIUM

CROSS-REFERENCE TO RELATED APPLICATION

The present application is a U.S. National Phase of International Patent Application Serial No. PCT/CN2021/098943 filed on Jun. 8, 2021. The entire contents of the above-cited application are hereby incorporated by reference in their entirety for all purposes.

BACKGROUND

In the related art, in a paging process of user equipment (UE), a change situation of a tracking reference signal (TRS) may be indicated by means of paging downlink control information (Paging DCI), or the change situation of the TRS may also be indicated by means of a system information block (SIB).

However, there are corresponding issues with both Paging DCI indication and SIB indication mentioned above.

SUMMARY

Examples of the disclosure provide a power saving method and apparatus, a device and a readable storage medium, which may improve the indication flexibility and resource utilization rate of TRS available information, thus achieving an effect of power saving. The technical solutions are as follows.

According to an aspect of the disclosure, a power saving method is provided and applied to an access network device, and includes: transmitting configuration information to a terminal, where the configuration information is used for configuring a relevant configuration of a tracking reference signal (TRS) for the terminal, and the relevant configuration includes an acquisition mode for TRS available information.

In another aspect, a power saving method is provided and applied to a terminal, and includes: receiving configuration information transmitted by an access network device, where the configuration information is used for configuring a relevant configuration of a tracking reference signal (TRS) for the terminal, and the relevant configuration includes an acquisition mode for TRS available information; and acquiring the TRS available information based on the configuration information.

In yet another aspect, an access network device is provided, and includes: one or more processors; and a transceiver communicatively connected with the one or more processors. Wherein the one or more processors are collectively configured to load and execute executable instructions so as to implement the power saving method described in the above example of the disclosure.

In yet another aspect, a terminal is provided, and includes: one or more processors; and a transceiver communicatively connected with the one or more processors. Wherein the one or more processors are collectively configured to load and execute executable instructions so as to implement the power saving method described in the above example of the disclosure.

In yet another aspect, a computer readable storage medium is provided, and stores at least one instruction, at least one program, a code set or an instruction set, where the at least one instruction, the at least one program, the code set or the instruction set is loaded and executed by a processor to implement the power saving method described in the above example of the disclosure.

BRIEF DESCRIPTION OF THE DRAWINGS

In order to more clearly illustrate the technical solutions in examples of the disclosure, accompanying drawings needing to be used in the description of the examples will be briefly introduced below. Apparently, the accompanying drawings in the following description are merely some examples of the disclosure. For those ordinarily skilled in the art, other accompanying drawings may further be obtained according to these accompanying drawings without any creative labor.

DETAILED DESCRIPTION

In order to make objectives, technical solutions and advantages of the disclosure clearer, embodiments of the disclosure will be further described in detail below with reference to accompanying drawings.

The disclosure relates to the field of communications, in particular to a power saving method and apparatus, a device and a readable storage medium.

In the related art, in a paging process of user equipment (UE), a change situation of a tracking reference signal (TRS) may be indicated by means of paging downlink control information (Paging DCI), or the change situation of the TRS may also be indicated by means of a system information block (SIB).

However, there are corresponding issues with both Paging DCI indication and SIB indication mentioned above.

If a change frequency of TRS on/off is low, using the Paging DCI to indicate the change situation of the TRS will waste a resource utilization rate of DCI indication information and have low indication efficiency. If a high-level configuration is merely indicated through the SIB, since the indication of the SIB is at a cell level, a changing speed is low, resulting in insufficient flexibility.

Figures 1, 2:
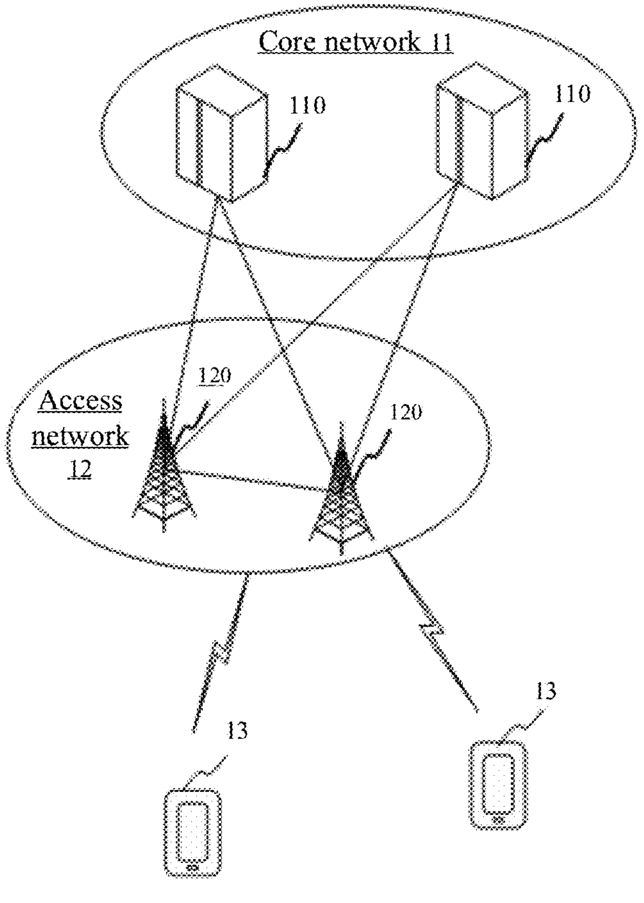
FIG. 1 is a block diagram of an architecture of a communication system provided by an example of the disclosure.
FIG. 2 is a flow chart of a power saving method illustrated by an example of the disclosure.

FIG. 1 shows a block diagram of a communication system provided by an example of the disclosure. The communication system may include: a core network 11, an access network 12 and a terminal 13.

The core network 11 includes a plurality of core network devices 110. Each core network device 110 includes an access and mobility management function (AMF), a session management function (SMF), a user plane function (UPF) and other devices. The AMF is used for controlling access permissions and switching functions of a terminal, and the SMF is used for providing server continuity and uninterrupted user experience, such as Internet protocol (IP) addresses and anchor point changes.

The access network 12 includes a plurality of access network devices 120. Each access network device 120 may be a base station, and the base station is an apparatus deployed in an access network to provide a wireless communication function for the terminal. The base station may include various forms of macro base stations, micro base stations, relay stations, access points and so on. In systems adopting different wireless access technologies, names of devices with base station functions may be different, for example, in a long term evolution (LTE) system, it is called eNodeB or eNB; and in a 5G new radio (NR) system, it is called gNode B or gNB. With evolution of a communication technology, the description of the name of "base station" may change. In order to facilitate the description in the examples of the disclosure, the apparatuses that provide the wireless communication functions for the terminal are collectively called access network devices.

The terminal 13 may include various handheld devices, vehicle-mounted devices, wearable devices and computing devices with wireless communication functions or other processing devices connected to a wireless modem, as well as various forms of user equipment (UE), mobile stations (MSs), terminal devices and the like. In order to facilitate the description, the devices mentioned above are collectively called terminals. The access network device 120 and the terminal 13 communicate with each other through a certain new radio technology, such as a Uu interface. Industrial sensors, video surveillances and wearable devices based on 5G do not need to support such a large bandwidth, especially the industrial sensors, which merely need a few megabytes of transmission bandwidth. This type of terminals may be classified as a new type of terminals in subsequent 5G version enhancements, and corresponding technical features will be improved.

Optionally, during wireless communication between the above terminal 13 and the access network device 120, wireless communication may be performed through a licensed frequency band or an unlicensed frequency band.

In an idle state, the terminal needs to perform paging detection according to a paging occasion cycle. How the terminal implements paging detection is briefly described below.

The access network device configures a plurality of paging occasions (POs) and corresponding control channel resource information in a synchronization signal and physical broadcast channel (PBCH) block (SSB) cycle.

According to a formula of R15 38.304, the terminal uses information such as an identifier (ID) of the terminal to calculate its own paging occasion position. When the paging occasion comes, the terminal detects paging downlink control information (Paging DCI) according to the configured control channel resource information.

The terminal acquires a paging category according to a content of DCI, and if it is a paging message scheduling category, a corresponding physical downlink shared channel (PDSCH) message is demodulated (the resource is also indicated in the DCI).

After demodulating the PDSCH message, the terminal checks a terminal ID in it, if there is no own ID, it continues to wait for a next paging occasion, and the above process is repeated. However, the above paging detection process needs to consume a lot of power energy, which increases the power consumption of the terminal.

In the related art, in a paging process of UE, a change situation of a tracking reference signal (TRS) may be indicated by means of paging downlink control information (Paging DCI), or the change situation of the TRS may also be indicated by means of a system information block (SIB).

However, there are corresponding issues with both Paging DCI indication and SIB indication mentioned herein.

1. If a change frequency of TRS on/off is low, using the Paging DCI to indicate the change situation of the TRS will waste a resource utilization rate of DCI indication information and have low indication efficiency. However, the UE cannot determine whether to acquire indication through the SIB, if a high-level configuration is merely indicated through the SIB, and since the indication of the SIB is at a cell level, a changing speed is low, resulting in insufficient flexibility.

2. If the change frequency of TRS on/off is high, and there is no paging message corresponding to the UE in a certain PO, the base station further needs to transmit additional Paging DCI for indication. The priority of a TRS on/off change situation is relatively low, and relative to the importance of transmitting system information updates/short messages in the Paging DCI, transmitting the additional Paging DCI to indicate the TRS on/off change situation undoubtedly wastes system resources.

The communication system and business scenarios described in the examples of the disclosure are intended to explain the technical solutions of the examples of the disclosure more clearly, and do not constitute a limitation on the technical solutions provided by the examples of the disclosure. Those ordinarily skilled in the art may know that with the evolution of the communication system and the emergence of new business scenarios, the technical solutions provided by the examples of the disclosure are also applicable to similar technical problems.

FIG. 2 is a flow chart of a power saving method provided by an example of the disclosure, a situation that the method is applied to an access network device is taken as an example for illustration, and as shown in FIG. 2, the method includes step 201.

In step 201, configuration information is transmitted to a terminal, where the configuration information is used for configuring a relevant configuration of a tracking reference signal (TRS) for the terminal.

In some examples, the configuration information is transmitted to the terminal in an idle state.

There may be a small deviation in a frequency between the access network device and a physical crystal oscillator of the terminal, and it is impossible to achieve complete consistency, which results in a phase deviation in a radio-frequency carrier signal received by the terminal. In a schematic diagram of a demodulation symbol of a received subcarrier, it is manifested as a phase rotation, that is, a received modulation symbol deviates from a certain phase angle, which is caused by the accumulation of frequency deviation over time. At this point, a TRS is needed to track the rotational phase of other data signals.

In some examples, the mode to acquire TRS available information includes at least one of acquiring from a system information block (SIB) and reading from physical layer information. Since the system information block (SIB) is a cell level message, when the TRS available information is configured in the SIB, the acquisition and configuration of the TRS available information need to be performed on all UE in a cell, so as to transmit the SIB to the UE, and an updating speed is relatively low. However, the physical layer information indicates limited resources, and there is a waste of resources in transmitting the TRS available information through the physical layer information. When both the SIB and the physical layer information transmit the TRS available information simultaneously, due to differences in data processing time, it is prone to causing the TRS available information indicated by the SIB and the physical layer information to be different, and thus the TRS available information cannot be accurately indicated.

The relevant configuration includes an acquisition mode for the TRS available information corresponding to the terminal. Optionally, the configuration information is used for indicating a mode for the terminal to acquire the TRS available information when the terminal is in the idle state.

In the example of the disclosure, the configuration information is used for indicating the mode for the terminal to acquire the TRS available information, such as acquiring the TRS available information through the SIB, or acquiring the TRS available information through the physical layer information.

In some examples, the configuration information includes a first indication field, and the first indication field is used for indicating the mode for the terminal to acquire the TRS available information.

Optionally, the first indication field occupies one bit; or the first indication field occupies a plurality of (two or more than two) bits; or the first indication field is composed of a combination of a plurality of bit code points.

The access network device determines a value of the first indication field based on a change frequency of the TRS available information corresponding to the terminal.

In some examples, in response to the change frequency of the TRS available information corresponding to the terminal being lower than (or equal to) a frequency threshold, it is determined that the first indication field corresponds to a first value, and the first value is used for indicating the terminal to read the TRS available information from the physical layer information. That is, the first value corresponds to the acquisition mode of reading the TRS available information from the physical layer information. In response to the change frequency of the TRS available information corresponding to the terminal reaching (being greater than or equal to) the frequency threshold, it is determined that the first indication field corresponds to a second value, the second value is used for indicating the terminal to read the TRS available information from the system information block (SIB). That is, the second value corresponds to the acquisition mode of reading the TRS available information from the system information block (SIB), and the second value also corresponds to a mode of directly understanding a TRS available mode according to the TRS available information configured by the SIB without reading the TRS available information from the physical layer information.

It is worth noting that the situation that the above first value corresponds to the physical layer information, and the second value corresponds to the SIB is merely a schematic example, and the example of the disclosure may further be implemented under the situation that the first value corresponds to the SIB, and the second value corresponds to the physical layer information, which is not limited in the example of the disclosure.

Schematically, in response to a value corresponding to the first indication field being 1, the terminal is indicated to read the TRS available information from the SIB. In response to a value corresponding to the first indication field being 0, the terminal is indicated to read the TRS available information from the physical layer information.

When the first indication field is composed of the combination of the plurality of bit code points, and in response to the plurality of bit code points forming a first combination mode, the first indication field is used for indicating the terminal to read the TRS available information from the SIB. In response to the plurality of bit code points forming a second combination mode, the first indication field is used for indicating the terminal to read the TRS available information from the physical layer information.

Schematically, when the plurality of bit code points corresponding to the first indication field form 1011, the terminal is indicated to read the TRS available information from the SIB, and when the plurality of bit code points corresponding to the first indication field form 0110, the terminal is indicated to read the TRS available information from the physical layer information.

Optionally, the above configuration information is implemented as a paging early indication (PEI) sequence; or the above configuration information is implemented as paging early indication (PEI) physical layer information.

When the configuration information is implemented as the PEI sequence, and since information carried by the PEI sequence is limited, the first indication field occupies 1 bit; and when the configuration information is implemented as the PEI physical layer information, such as PEI DCI, the first indication field may occupy 1 bit, may occupy a plurality of bits, and may further be composed of the combination of the plurality of bit code points.

That is, in the example of the present application, a switch is added in the PEI and used for indicating the acquisition mode for the TRS available information corresponding to the terminal. Schematically, when the first indication field is 0, it indicates that the switch is in an on state, and the TRS available information is parsed from the Paging DCI correspondingly. When the first indication field is 1, it indicates that the switch is in an off state, and the terminal does not need to parse the TRS available information from the Paging DCI and may directly understand the TRS available mode according to the TRS available information configured in the SIB.

In some examples, when the above configuration information is implemented as the PEI physical layer information, the above configuration information further includes a second indication field, and the second indication field is used for indicating a configuration of the TRS available information.

After acquiring the configuration information, the access network device transmits the configuration information to UE, and the UE acquires the TRS available information based on the configuration information.

In summary, in the method provided by the example of the disclosure, by means of introducing the switch into the PEI, the mode for the UE to parse the TRS available information is indicated. Thereby avoiding waste of resources caused by indicating a TRS change situation merely by means of the paging DCI, avoiding a problem of low flexibility caused by indicating the TRS change situation merely by means of the SIB, improving the indication flexibility and resource utilization rate of the TRS available information, and thus achieving the effect of saving power.

Figures 3, 4:
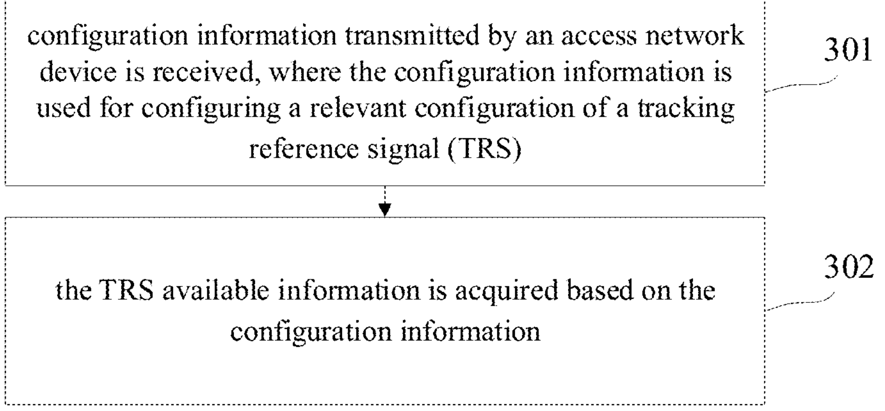
FIG. 3 is a flow chart of a power saving method illustrated by an example of the disclosure.
FIG. 4 is a flow chart of a power saving method illustrated by an example of the disclosure.

FIG. 3 is a flow chart of a power saving method provided by an example of the disclosure, a situation that the method is applied to a terminal is taken as an example for illustration, and as shown in FIG. 3, the method includes steps 301 and 302.

In step 301, configuration information transmitted by an access network device is received, where the configuration information is used for configuring a relevant configuration of a tracking reference signal (TRS).

Optionally, the current terminal is a terminal in an idle state. That is, the terminal receives the configuration information transmitted by the access network device when in the idle state.

In the example of the disclosure, the configuration information is used for indicating the mode for the terminal to acquire TRS available information, such as acquiring the TRS available information through an SIB, or acquiring the TRS available information through physical layer information.

In some examples, the configuration information includes a first indication field, and the first indication field is used for indicating the mode for the terminal to acquire the TRS available information.

Optionally, the first indication field occupies one bit; or the first indication field occupies a plurality of (two or more than two) bits; or the first indication field is composed of a combination of a plurality of bit code points.

The terminal reads the first indication field from the configuration information, and determines the mode to acquire the TRS available information according to the first indication field.

In some examples, in response to the change frequency of the TRS available information corresponding to the terminal being lower than (or equal to) a frequency threshold, it is determined that the first indication field corresponds to a first value, and the first value is used for indicating the terminal to read the TRS available information from the physical layer information. And in response to the change frequency of the TRS available information corresponding to the terminal reaching (being greater than or equal to) the frequency threshold, it is determined that the first indication field corresponds to a second value, and the second value is used for indicating the terminal to read the TRS available information from the system information block (SIB).

That is, the first indication field is read from the configuration information, and the first indication field is used for indicating the mode to acquire the TRS available information.

Optionally, the above configuration information is implemented as a PEI sequence; or the above configuration information is implemented as PEI physical layer information.

When the configuration information is implemented as the PEI sequence, and since information carried by the PEI sequence is limited, the first indication field occupies 1 bit; and when the configuration information is implemented as the PEI physical layer information, such as PEI DCI, the first indication field may occupy 1 bit, may occupy a plurality of bits, and may further be composed of the combination of the plurality of bit code points.

Then, in step 302, the TRS available information is acquired based on the configuration information.

In some examples, the TRS available information includes an available position of a TRS corresponding to the terminal, namely the TRS available information corresponding to the terminal.

In some examples, after acquiring the TRS available information, the terminal tracks a rotational phase of a data signal according to the TRS available information and performs time-frequency synchronization.

In summary, in the method provided by the example of the disclosure, by means of introducing a switch into a PEI, a mode for UE to parse the TRS available information is indicated. Thereby avoiding waste of resources caused by indicating a TRS change situation merely by means of the paging DCI, avoiding a problem of low flexibility caused by indicating the TRS change situation merely by means of the SIB, improving the indication flexibility and resource utilization rate of the TRS available information, and thus achieving the effect of saving power.

FIG. 4 is a flow chart of a power saving method provided by another example of the disclosure, a situation that the method is applied to a terminal and an access network device is taken as an example for illustration, and the method includes steps 401-403.

In step 401, the access network device transmits configuration information to the terminal.

The configuration information is used for configuring a relevant configuration of a tracking reference signal (TRS) for the terminal. The relevant configuration includes an acquisition mode for TRS available information corresponding to the terminal.

In the example of the disclosure, the configuration information is used for indicating the mode for the terminal to acquire the TRS available information, such as acquiring the TRS available information through an SIB, or acquiring the TRS available information through physical layer information.

In some examples, the configuration information includes a first indication field, and the first indication field is used for indicating the mode for the terminal to acquire the TRS available information.

Optionally, the first indication field occupies one bit; or the first indication field occupies a plurality of (two or more than two) bits; or the first indication field is composed of a combination of a plurality of bit code points.

The access network device determines a value of the first indication field based on a change frequency of the TRS available information corresponding to the terminal.

In some examples, in response to the change frequency of the TRS available information corresponding to the terminal being lower than (or equal to) a frequency threshold, it is determined that the first indication field corresponds to a first value, and the first value is used for indicating the terminal to read the TRS available information from the physical layer information. That is, the first value corresponds to the acquisition mode of reading the TRS available information from the physical layer information. And in response to the change frequency of the TRS available information corresponding to the terminal reaching (being greater than or equal to) the frequency threshold, it is determined that the first indication field corresponds to a second value, the second value is used for indicating the terminal to read the TRS available information from the system information block (SIB). That is, the second value corresponds to the acquisition mode of reading the TRS available information from the system information block (SIB), and the second value also corresponds to a mode of directly understanding a TRS available mode according to the TRS available information configured by the SIB without reading the TRS available information from the physical layer information.

Optionally, the above configuration information is implemented as a paging early indication (PEI) sequence; or the above configuration information is implemented as paging early indication (PEI) physical layer information.

When the configuration information is implemented as the PEI sequence, and since information carried by the PEI sequence is limited, the first indication field occupies 1 bit; and when the configuration information is implemented as the PEI physical layer information, such as PEI DCI, the first indication field may occupy 1 bit, may occupy a plurality of bits, and may further be composed of the combination of the plurality of bit code points. In some examples, when the above configuration information is implemented as the PEI physical layer information, the above configuration information further includes a second indication field, and the second indication field is used for indicating a configuration of the TRS available information.

In returning to the steps of FIG. 4, in step 402, the terminal receives the configuration information transmitted by the access network device.

Optionally, after receiving the configuration information transmitted by the access network device, the terminal reads the first indication field from the configuration information, and determines a corresponding mode to acquire the TRS available information according to a value of the first indication field. The terminal reads the first indication field according to a pre-configured indication field indication mode.

In step 403, the terminal acquires the TRS available information based on the configuration information.

In some examples, the TRS available information is used for indicating a TRS available position corresponding to the terminal in a paging cycle.

In summary, in the method provided by the example of the disclosure, by means of introducing a switch into a PEI, a mode for UE to parse the TRS available information is indicated. Thus, avoiding waste of resources caused by indicating a TRS change situation merely by means of the paging DCI, avoiding a problem of low flexibility caused by indicating the TRS change situation merely by means of the SIB, improving the indication flexibility and resource utilization rate of the TRS available information, and further achieving the effect of saving power.

Figure 5:
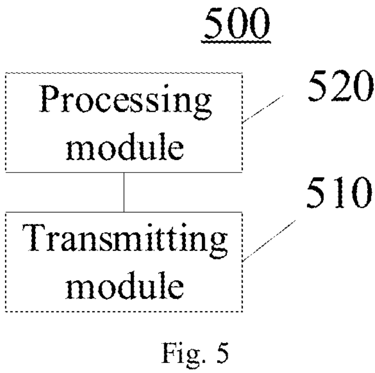
FIG. 5 is a structural block diagram of a power saving apparatus illustrated by an example of the disclosure.

FIG. 5 is a structural block diagram of a power saving apparatus 500 provided by an example of the disclosure. As shown in FIG. 5, the apparatus 500 is applied to an access network device, and includes a transmitting module 510 and a processing module 520.

The transmitting module 510 is configured to transmit configuration information to a terminal. Where the configuration information is used for configuring a relevant configuration of a tracking reference signal (TRS) for the terminal, and the relevant configuration includes an acquisition mode for TRS available information.

In an optional example, the transmitting module 510 is further configured to transmit the configuration information to the terminal in an idle state.

In an optional example, the configuration information includes a first indication field; and the first indication field is used for indicating a mode for the terminal to acquire the TRS available information.

The processing module 520 is configured to determine a value of the first indication field based on a change frequency of the TRS available information corresponding to the terminal.

In an optional example, the processing module 520 is further configured to determine, in response to the change frequency of the TRS available information corresponding to the terminal being lower than a frequency threshold, that the first indication field corresponds to a first value. Where the first value correspondingly reads the acquisition mode of the TRS available information from physical layer information. Additionally, the processing module 520 is further configured to determine, in response to the change frequency of the TRS available information corresponding to the terminal reaching the frequency threshold, that the first indication field corresponds to a second value. Where the second value correspondingly reads the acquisition mode of the TRS available information from a system information block (SIB).

In an optional example, the configuration information is a paging early indication sequence; or the configuration information is paging early indication physical layer information.

In an optional example, in response to the configuration information being the paging early indication sequence, the first indication field occupies 1 bit. In an optional example, in response to the configuration information being the paging early indication physical layer information, the first indication field occupies 1 bit, or the first indication field occupies a plurality of bits, or the first indication field is composed of a combination of a plurality of bit code points.

In an optional example, in response to the configuration information being the paging early indication physical layer information, the configuration information further includes a second indication field; and the second indication field is used for indicating a configuration of the TRS available information.

In an optional example, the TRS available information includes an available position of a TRS corresponding to the terminal. In an optional example, the physical layer information includes paging downlink control information (Paging DCI).

Figure 6:
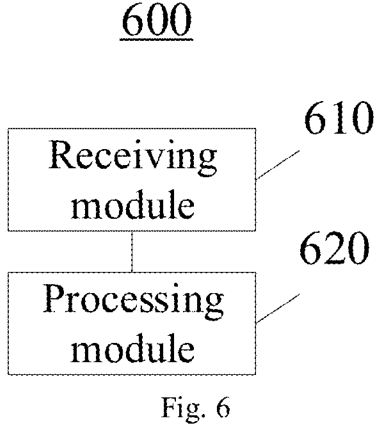
FIG. 6 is a structural block diagram of a power saving apparatus illustrated by an example of the disclosure.

FIG. 6 is a structural block diagram of a power saving apparatus 600 provided by an example of the disclosure. As shown in FIG. 6, the apparatus 600 is applied to a terminal, and includes a receiving module 610 and a processing module 620.

The receiving module 610 is configured to receive configuration information transmitted by an access network device, such as that shown in FIG. 5. Where the configuration information is used for configuring a relevant configuration of a tracking reference signal (TRS) for the terminal, and the relevant configuration includes an acquisition mode for TRS available information.

The processing module 620 is configured to acquire the TRS available information based on the configuration information.

In an optional example, the receiving module 610 is further configured to receive the configuration information transmitted by the access network device in an idle state.

In an optional example, the configuration information includes a first indication field; and the processing module 620 is further configured to read the first indication field from the configuration information. Where the first indication field is used for indicating a mode to acquire the TRS available information.

In an optional example, the processing module 620 further reads, in response to the first indication field corresponding to a first value, the TRS available information from physical layer information. Additionally, the processing module 620 further reads, in response to the first indication field corresponding to a second value, the TRS available information from a system information block (SIB).

In an optional example, the configuration information is a paging early indication sequence; or the configuration information is paging early indication physical layer information.

In an optional example, in response to the configuration information being the paging early indication sequence, the first indication field occupies 1 bit. In an optional example, in response to the configuration information being the paging early indication physical layer information, the first indication field occupies 1 bit, or the first indication field occupies a plurality of bits, or the first indication field is composed of a combination of a plurality of bit code points.

In an optional example, in response to the configuration information being the paging early indication physical layer information, the configuration information further includes a second indication field; and the processing module further reads the second indication field from the configuration information, where the second indication field is used for indicating an existence situation of the TRS available information.

In an optional example, the TRS available information includes an available position of a TRS corresponding to the terminal.

In an optional example, the physical layer information includes paging downlink control information (Paging DCI).

In summary, in the apparatus provided by the example of the disclosure, by means of introducing a switch into a PEI, a mode for UE to parse the TRS available information is indicated, thus avoiding waste of resources caused by indicating a TRS change situation merely by means of the paging DCI, avoiding a problem of low flexibility caused by indicating the TRS change situation merely by means of the SIB, improving the indication flexibility and resource utilization rate of the TRS available information, and thus achieving the effect of saving power.

Figure 7:
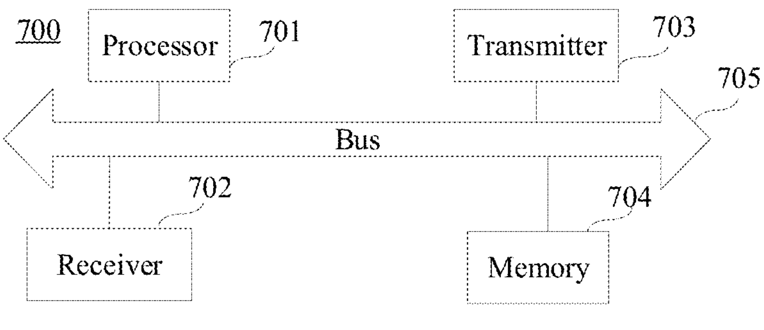
FIG. 7 is a structural block diagram of a communication device illustrated by an example of the disclosure.

FIG. 7 shows a schematic structural diagram of a communication device 700 (a terminal or an access network device) provided by an example of the disclosure, and the communication device 700 includes a processor 701, a receiver 702, a transmitter 703, a memory 704 and a bus 705.

The processor 701 includes one or more than one processing core, and the processor 701 executes various functional applications and information processing by running software programs and modules.

The receiver 702 and the transmitter 703 may be implemented as a communication component, and the communication component may be a communication chip.

The memory 704 is connected with the processor 701 through the bus 705. Additionally, the processor 701, the receiver 702, the transmitter 703, and the memory 704 are all connected to each other via the bus 705.

The memory 704 may be configured to store at least one instruction, and the processor 701 is configured to execute the at least one instruction, so as to implement various steps in the method examples included herein.

In addition, the memory 704 may be implemented by any type of volatile or nonvolatile storage device or their combination, the volatile or nonvolatile storage device includes, but is not limited to a magnetic disk or optional disk, an electrically erasable programmable read only memory (EEPROM), an erasable programmable read only memory (EPROM), a static random access memory (SRAM), a read-only memory (ROM), a magnetic memory, a flash memory, and a programmable read-only memory (PROM).

A non-transitory computer readable storage medium, where instructions in the non-transitory computer readable storage medium, when executed by a processor of a terminal, cause the terminal to execute the above power saving method.

In summary, in the power saving apparatus provided by the disclosure, by means of introducing a switch into a PEI, a mode for UE to parse the TRS available information is indicated, thus avoiding waste of resources caused by indicating a TRS change situation merely by means of the paging DCI, avoiding a problem of low flexibility caused by indicating the TRS change situation merely by means of the SIB, improving the indication flexibility and resource utilization rate of the TRS change situation, and thus achieving the effect of saving power.

An example of the disclosure further provides a power saving system, including a terminal and an access network device; the terminal includes the power saving apparatus provided by the example as shown in FIG. 5; and the access network device includes the power saving apparatus provided by the example as shown in FIG. 6.

An example of the disclosure further provides a non-transitory computer readable storage medium, storing at least one instruction, at least one program, a code set or an instruction set, and the at least one instruction, the at least one program, the code set or the instruction set is loaded and executed by a processor to implement steps executed by a terminal in the power saving method provided by each method example.

It needs to be understood that the reference to "a plurality of" in this article refers to two or more than two. "And/or" describes an association relationship of associated objects, which means that there may be three kinds of relationships, for example, A and/or B, which may represent three cases: the existence of A alone, the simultaneous existence of A and B, and the existence of B alone. The character "/" universally indicates that the associated objects are in an "or" relationship.

Other examples of the disclosure will be apparent to those skilled in the art from consideration of the specification and practice of the disclosure here. The disclosure is intended to cover any variations, uses, or adaptations of the disclosure following its general principles and including such departures from the disclosure as come within known or customary practice in the art. The specification and examples are considered as instances merely, and the true scope and spirit of the disclosure are indicated by the following claims.

It needs to be understood that the disclosure is not limited to the exact structure that has been described above and illustrated in the accompanying drawings, and various modifications and changes may be made without departing from its scope. It is intended that the scope of the disclosure is merely limited by the appended claims.

The invention claimed is:

1. A power saving method, performed by an access network device, comprising:

transmitting configuration information to a terminal, wherein the configuration information comprises a first indication field, and the first indication field is configured to indicate a mode for the terminal to acquire tracking reference signal (TRS) available information;

determining, in response to a change frequency of the TRS available information corresponding to the terminal being lower than a frequency threshold, that the first indication field corresponds to a first value, wherein the first value corresponds to an acquisition mode of reading the TRS available information from physical layer information; and determining, in response to the change frequency of the TRS available information corresponding to the terminal reaching the frequency threshold, that the first indication field corresponds to a second value, wherein the second value corresponds to an acquisition mode of reading the TRS available information from a system information block (SIB).

2. The method according to claim 1, further comprising:

transmitting the configuration information to the terminal in an idle state.

3. The method according to claim 1, further comprising:

determining a value of the first indication field based on a change frequency of the TRS available information corresponding to the terminal.

4. The method according to claim 1, wherein
the configuration information is at least one of a paging early indication sequence or paging early indication physical layer information.

5. The method according to claim 4, wherein
in response to the configuration information being the paging early indication sequence, the first indication field occupies 1 bit.

6. The method according to claim 4, wherein in response to the configuration information being the paging early indication physical layer information, the first indication field
occupies 1 bit, or
occupies a plurality of bits, or
is composed of a combination of a plurality of bit code points.

7. The method according to claim 4, wherein
in response to the configuration information being the paging early indication physical layer information, the configuration information further comprises a second indication field; and
the second indication field is configured to indicate a configuration of the TRS available information.

8. The method according to claim 1, wherein the TRS available information comprises an available position of a TRS corresponding to the terminal.

9. The method according to claim 1, wherein the physical layer information comprises paging downlink control information (Paging DCI).

10. An access network device, comprising:
one or more processors; and
a transceiver communicatively connected with the one or more processors,
wherein the one or more processors are collectively configured to load and execute executable instructions so as to implement the power saving method according to claim 1.

11. The method according to claim 1, wherein the TRS available information comprises an available position of a TRS corresponding to the terminal.

12. A power saving method, performed by a terminal, comprising:
receiving configuration information transmitted by an access network device, wherein the configuration information comprises a first indication field, and the first indication field is configured to indicate a mode to acquire tracking reference signal (TRS) available information; and
acquiring the TRS available information based on the configuration information,
wherein acquiring the TRS available information based on the configuration information comprises:
reading, in response to the first indication field corresponding to a first value, the TRS available information from physical layer information; and
reading, in response to the first indication field corresponding to a second value, the TRS available information from a system information block (SIB).

13. The method according to claim 12, further comprising:
receiving the configuration information transmitted by the access network device when in an idle state.

14. The method according to claim 12, wherein
the configuration information is at least one of a paging early indication sequence, or paging early indication physical layer information.

15. The method according to claim 14, wherein in response to the configuration information being the paging early indication physical layer information, the configuration information further comprises a second indication field; and the method further comprises:
reading the second indication field from the configuration information, wherein the second indication field is configured to indicate a configuration of the TRS available information.

16. A non-transitory computer readable storage medium, storing at least one instruction, at least one program, and a code set or an instruction set, wherein the at least one instruction, the at least one program, and the code set or the instruction set is loaded and executed by a processor to implement the power saving method according to claim 12.

17. The method according to claim 12, wherein the TRS available information comprises an available position of a TRS corresponding to the terminal.

18. A terminal, comprising:
one or more processors; and
a transceiver communicatively connected with the one or more processors,
wherein the one or more processors are collectively configured to:
receive configuration information transmitted by an access network device, wherein the configuration information comprises a first indication field, and the first indication field is configured to indicate a mode to acquire tracking reference signal (TRS) available information; and
acquire the TRS available information based on the configuration information,
wherein the one or more processors are further collectively configured to:
read, in response to the first indication field corresponding to a first value, the TRS available information from physical layer information; and
read, in response to the first indication field corresponding to a second value, the TRS available information from a system information block (SIB).

19. The terminal according to claim 18, wherein the TRS available information comprises an available position of a TRS corresponding to the terminal.

* * * * *